E. WHITE.
STOVE.
APPLICATION FILED MAY 26, 1917.
1,330,017.
Patented Feb. 3, 1920.
2 SHEETS—SHEET 1.
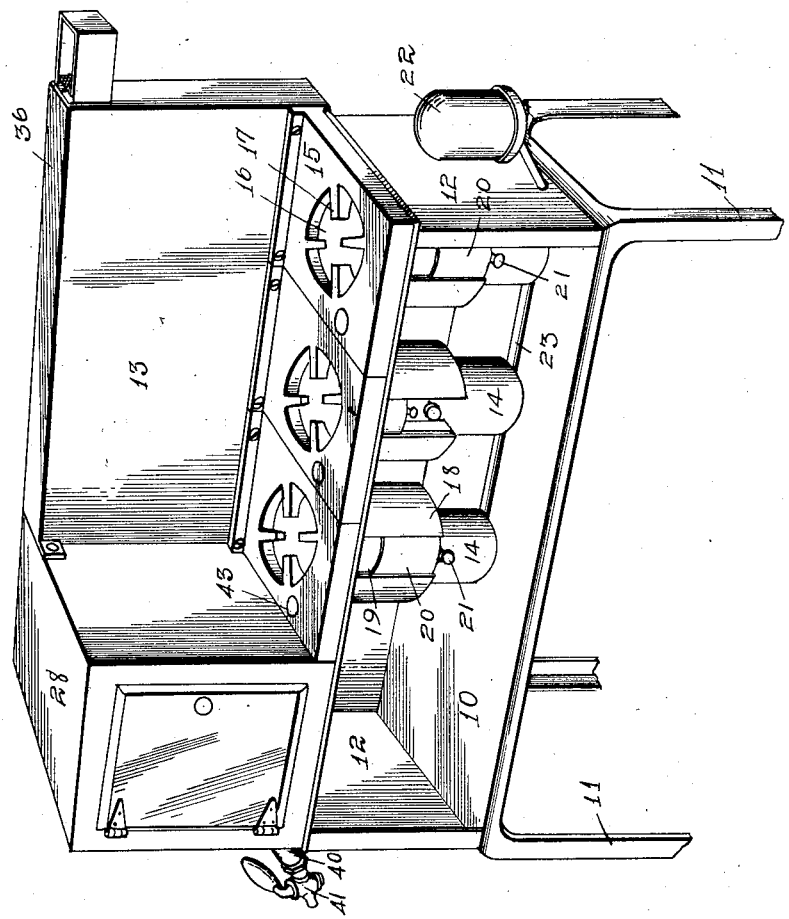
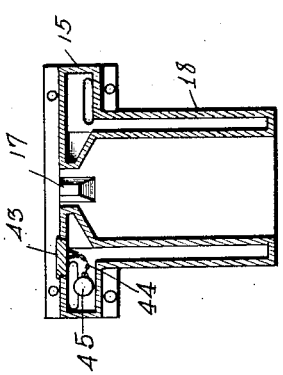
Inventor
Elizabeth White.
by Orwig & Bair attys E. WHITE.
STOVE.
APPLICATION FILED MAY 26, 1917.
1,330,017.
Patented Feb. 3, 1920.
2 SHEETS—SHEET 2.
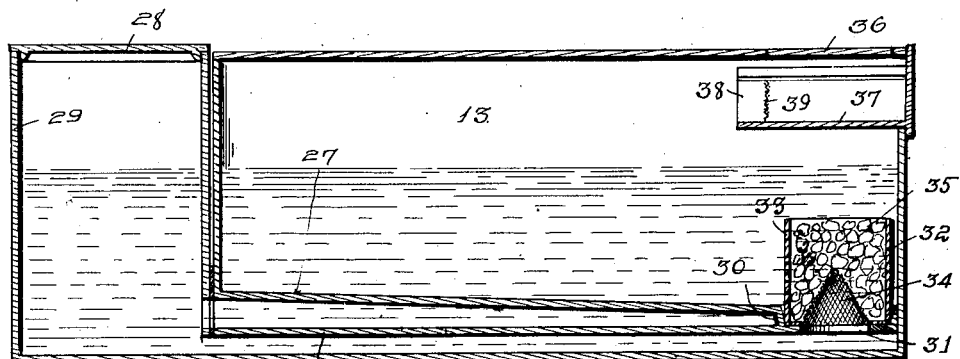
Fig. 3.
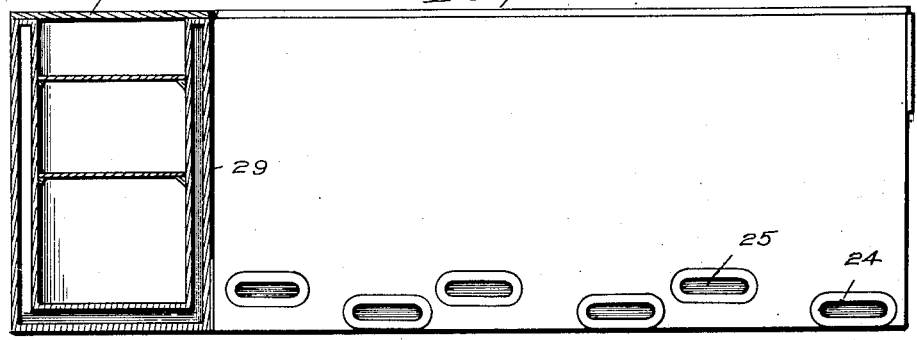
Fig. 4.
Fig. 5.
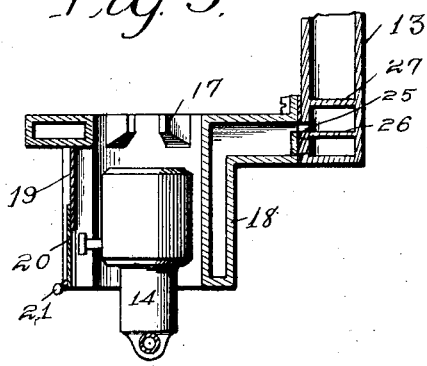
Fig. 6.
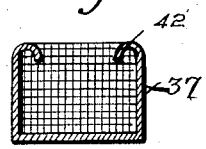
Inventor
Elizabeth White
by Orwig & Bair
attys

UNITED STATES PATENT OFFICE.

ELIZABETH WHITE, OF BOONE, IOWA.

STOVE.

1,330,017.  Specification of Letters Patent.  Patented Feb. 3, 1920.

Application filed May 26, 1917. Serial No. 171,316.

*To all whom it may concern:*

Be it known that I, ELIZABETH WHITE, a citizen of the United States, and resident of Boone, in the county of Boone and State of Iowa, have invented a certain new and useful Stove, of which the following is a specification.

The object of my invention is to provide a stove of the oil burning type having a hot water reservoir of peculiar construction.

A further object is to provide such a stove having a hot water reservoir so arranged that the water will be heated from any of the burners for keeping the water hot in the reservoir.

Still a further object is to provide such a stove having a supply of cold water, the parts being so arranged that only a sufficient amount of water will be heated at a time to keep the water hot in the hot water reservoir.

A further object is to provide such a device having water jackets for the burners, and having sliding heat retaining members.

A further object is to provide such a stove having a suitable filtering device.

A further object is to provide such a stove with means for collecting lime from the water, said means being adapted to be readily and easily removed for throwing the lime away.

With these and other objects in view my invention consists in the construction, arrangement and combination of the various parts of the device, whereby the objects contemplated are attained, as hereinafter more fully set forth, pointed out in my claim, and illustrated in the accompanying drawings, in which:

Figure 1 shows a perspective view of a stove embodying my invention.

Fig. 2 shows a vertical, sectional view through the water jacket of one of the burners.

Fig. 3 shows a vertical, sectional view through the reservoir, and the cold water supply tank.

Fig. 4 shows a front view of the cold water supply tank, the warming oven and jacket therefor, being shown in section.

Fig. 5 shows a vertical, sectional view of part of a cold water reservoir, and water jacket for one of the burners, taken at right-angles to the view taken in Fig. 2, and Fig. 6 shows a vertical, sectional view through the filler drawer.

In the accompanying drawings, I have used the reference numeral 10 to indicate generally the frame of my improved stove having the supporting legs 11, and the walls 12. At the rear of the upper part of the stove is a cold water supply tank 13.

Mounted on the stove is a plurality of burners 14. Above each burner 14 is mounted what I shall call the heater tank 15, provided with a central opening 16 into which project hollow fingers 17 for supporting cooking utensils and affording heating surface.

Each heating tank 15 is provided with a downward extension 18 arranged to surround the rear and sides of the upper portion of the burner having an open space 19 in its forward side.

Mounted in the space 19 is a slidable heat retaining member 20 having a handle 21. Outside one of the end walls 12 is a fuel supply tank 22 from which a tube 23 leads to the burners 14.

In the lower forward portion of the front wall of the cold water tank 13 is provided a series of openings. There are two openings 24 and 25 arranged to communicate with each heater tank 15. The openings 24 are lower than the openings 25, as shown in Fig. 4, and between the openings 24 and 25 there is provided a horizontal partition 26 spaced above which in the tank 13 is a false bottom 27.

At one end of the stove is a warming oven 28 having a water jacket 29 forming a hot water reservoir.

The space between the partition 26 and the false bottom 27 communicates with the water jacket 29, as does also the compartment or space between the partition 26 and the bottom of the tank 13.

The false bottom 27 terminates short of the end of the tank 13 opposite the heat reservoir, and is connected by a transverse partition 30 with the partition 26. The partition 26 is provided in its end beyond the false bottom 27 with an opening 31, whereby communication is afforded between the upper interior of the tank 13 and the compartment below the partition 26.

Resting upon the partition 26 above the opening 31 is a filtering device comprising a cylinder 32 having a perforated wall 33, and having in its bottom an upwardly extending hollow cone 34, preferably made of screen wire or the like. The cylinder 32 is filled with charcoal 35 or other suitable filtering material.

The tank 13 is provided in its top with a removable cover member 36 for permitting the insertion or removal of the filtering device.

Slidably mounted in the upper portion of the tank 13 at the end thereof opposite the hot water tank is a drawer 37, the inner end of which is open at 38, and which is provided with a transverse partition 39 near its inner end of wire or the like to permit the free passage of water. The drawer may be partially withdrawn from the tank 13 to permit water to be poured into said drawer, which water will pass freely through the partition 39 to the interior of the tank 13.

The side walls of the drawer 37 are curved inwardly at their upper ends at 42, for preventing water from splashing out of the drawer while the supply of water in the tank is being replenished.

The lower portion of the hot water tank is provided with a suitable outlet tube 40 having a cock 41.

In the upper wall of each heater tank 13 is mounted a screw-threaded plug 43 to which is secured a chain 44, at the end of which is a marble 45 for collecting lime. It will be seen that the plug 43 may be removed for taking out the marble and knocking off the lime thereon. By such a device I prevent the accumulation of lime in the various tanks.

In the practical use of my improved stove, the parts of the stove are assembled in their positions shown in the drawings, and water is supplied to the cold water supply tank through the drawer member 37. It will, of course, be obvious that the water will seek its level throughout the tank.

When one of the burners, as for instance, the left-hand burner is lighted, the sliding device 20 is moved to position for retaining the heat and preventing its escape through the opening 19. It will be seen that the water in the extension 18 and in the heating tank 15 will be rapidly heated. At the same time any cooking vessel placed on the stove above the lighted burner will be heated in the ordinary way by the flame from the burner.

The water heated in the heater tank 15 will pass through the opening 25 opposite the left-hand water tank 15, and thence into the hot water tank.

In order to facilitate the circulations, the false bottom 27 is inclined slightly upwardly from its right-hand end toward the hot water tank. Cold water will pass through the opening to the heating tank 15. On account of the inclined position of the bottom 27, and on account of the fact that water in the compartment between the bottom and partition 27 must pass into the hot water tank, and on account of the arrangement of the circulating system generally, it will be seen that when only one of the burners is lighted, the effect will be to heat the water in the hot water tank, without affecting the water in the heating tanks 15 of the burners not lighted.

In other words anyone of the burners can be used for heating the water in the hot water tank without affecting the water in the other heating tanks on the extensions 18 thereof.

When water is drawn from the hot water tank through the cock 41, a fresh supply of cold water will be furnished to the compartment below the partition 26 through the filtering device from the cold water tank 13.

It will be observed that the warm water in the hot water tank will maintain a uniform warm temperature in the warming oven.

When the stove is in constant use, the plugs 43 should be removed at regular intervals, and the accumulation of lime knocked off the marbles 45.

It will be understood that changes might be made in the arrangement of the parts of my improved stove, without departing from the real spirit and purpose of my invention, and it is my intention to cover by this application any modified forms of structure or use of mechanical equivalents, which may be reasonably included within the scope of my claim.

I claim as my invention:

In a stove having a plurality of burners arranged substantially in the same horizontal plane, a plurality of cylindrical heating tank members substantially surrounding said burners, a closure member adapted to be slidably fixed in each of said heating tank members, whereby access for lighting said burners may be had and yet permitting said closure member to be moved to such position that it and said tank heating members will form a complete tubular shaped casing around each of said burners, hollow fingers extending inwardly and above said burners, formed near the upper portion of said tank heating members for retaining cooking utensils and the like about said burners, said fingers also forming additional heating surfaces for said heating tank members, each of said heating tank members being in communication with a hot water tank, whereby when anyone of said burners is in operation, it will cause the water in said hot water tank to become immediately heated, a cold water tank arranged in communication with said hot water tank and an outlet valve fixed to said hot water tank.

Des Moines, Iowa, May 5, 1917.

ELIZABETH WHITE.